(12) United States Patent
Roden

(10) Patent No.: US 8,505,421 B2
(45) Date of Patent: Aug. 13, 2013

(54) MULTIPLE TOOL HOLDING DEVICE FOR A LATHE

(76) Inventor: Tony Ray Roden, Burleson, TX (US)

( * ) Notice: Subject to any disclaimer, the term of this patent is extended or adjusted under 35 U.S.C. 154(b) by 213 days.

(21) Appl. No.: 13/136,717

(22) Filed: Aug. 9, 2011

(65) Prior Publication Data

US 2013/0036880 A1    Feb. 14, 2013

(51) Int. Cl.
*B23B 29/24* (2006.01)

(52) U.S. Cl.
USPC .............................................. 82/121; 82/159

(58) Field of Classification Search
USPC .............. 82/121, 158, 159, 160, 161; 407/67
See application file for complete search history.

(56) References Cited

U.S. PATENT DOCUMENTS

| | | | | |
|---|---|---|---|---|
| 568,428 | A | * | 9/1896 | Cody ............................. 82/161 |
| 590,051 | A | * | 9/1897 | Weddell ........................ 82/161 |
| 1,227,486 | A | | 5/1917 | Newman et al. |
| 2,366,079 | A | * | 12/1944 | Wilson ............................ 188/69 |
| 2,505,684 | A | | 4/1950 | McClernon |
| 2,505,685 | A | | 4/1950 | McClernon |
| 3,550,489 | A | | 12/1970 | Kuhn et al, |
| 3,665,789 | A | * | 5/1972 | Fisher ......................... 74/813 L |
| 3,943,802 | A | | 3/1976 | Luebkemann et al. |
| 3,955,257 | A | | 5/1976 | Herbst et al. |
| 4,058,034 | A | | 11/1977 | Lahm et al. |
| 6,146,060 | A | | 11/2000 | Rydberg et al. |
| 6,406,214 | B1 | | 6/2002 | Chene |
| 6,523,993 | B2 | | 2/2003 | Williams et al. |
| 6,599,050 | B1 | * | 7/2003 | Sjoo ................................ 403/97 |
| 7,013,773 | B2 | * | 3/2006 | Hansson ........................ 82/137 |

OTHER PUBLICATIONS

Patent Cooperation Treaty (PCT) International Search Report and Written Opinion of the International Searching Authority, Application No. PCT/US2012/49907 filed Aug. 8, 2012, applicant Tony Ray Roden, 7 pages.

* cited by examiner

*Primary Examiner* — Daniel Howell
*Assistant Examiner* — Nicole N Ramos
(74) *Attorney, Agent, or Firm* — Geoffrey A. Mantooth

(57) ABSTRACT

A tool-holding device for a lathe is provided including a lathe-attachment portion, with a base sized and shaped for placement on a lathe and attaching means for attaching the base to the lathe. The lathe-attachment portion also has a circular-perimeter, angled mounting apparatus integral with the base and having equal-sized wedge-shaped, double sloped clamping portions and a partly threaded central locking base-bore. Attached to the lathe-attachment portion is a frusto-conical multiple-tool tool-holder having a lower surface with an equal number of equal-sized wedge-shaped, double sloped clamping surfaces to mate with the clamping portions of the base. The upper surface of the tool-holder has insert pockets for attachment of tools. A central bore extends through the tool-holder for locking the tool-holding device to a lathe or other machine.

5 Claims, 10 Drawing Sheets

MULTIPLE TOOL HOLDING DEVICE FOR A
LATHE

BACKGROUND OF THE INVENTION

1. Field of the Invention

This invention relates to two-axis and other lathes and in particular relates to a multiple tool holding device for use on lathes.

2. Description of the Related Art

Lathes are machine tools that are used to rotate a work piece on its axis to perform a variety of operations, including outer diameter (O.D.) work piece operations such as roughing, finishing, profiling, grooving, threading, and parting off, and inner diameter (I.D.) work piece operations such as boring. Lathes include conventional lathes, NC (numerically controlled) lathes, CNC (computer numerically controlled) lathes, multi-tasking lathes and multi-axis lathes.

The tools are applied to the work piece to create an object on the lathe which has symmetry about an axis of rotation of the work piece. Material is removed from the work piece using a hardened cutting tool, which is usually fixed to a solid moveable mounting which is moved against the work piece by hand-control or computer-controlled motors. Cutting fluid is often pumped to the cutting site to cool and lubricate the cut and to wash away the resulting debris.

In a simple lathe, a carriage holds a tool bit and moves it longitudinally or perpendicularly to the work piece. The tool bit is mounted in a tool post, and in the prior art there is one tool bit per tool post, requiring changing of the tool bit for different types of cuts. Typical tools attached to metal lathes are long-shanked tools. Typically, tool bits are non-rotary cutting tools used in metal lathes. The cutting edge is ground to suit a particular machining operation and may be resharpened or reshaped as needed. The ground tool bit is held rigidly by a tool holder while it is cutting.

Typically, tools on a lathe are square shank tools for O.D. turning, for example 1-inch square shanks. Although some of the companies that provide lathe supplies (e.g., Kennametal, Iscar, Ingersol, Sanvik, Dorian, Mitsubishi, Widia, and Seco) have models in which the square shank tools are quickly interchangeable on the square-shank tool holders, these prior models do require changing of the tool, and resultant downtime for each change of tool to make possible a different type of cutting of the metal.

Generally, when a lathe is used to form a particular work piece, multiple tool bits, and therefore multiple tool holders must be used for the variety of cuts needed to form the finished piece. If it is desired to do operations not possible with tools already on a lathe, the tool holders on the lathe must be removed and replaced with a tool holder having the desired tool. Changing tool holders multiple times can substantially lengthen the time to finish tooling a work piece, and thus can increase the cost of the final work piece.

When a new tool holder is installed on a lathe, the new tool holder must be aligned (touched off) so that it is in the exact geometrical alignment site of the prior tool holder with respect to the work piece so that the cuts with the second tool holder are repeatable. In other words, x+z axis geometry offsets must be reset for each new tool.

It is therefore an object of the invention to provide a multiple tool-holding device for a two-axis lathe that reduces the number of tool changing operations and therefore the time and cost to produce a finished work piece. In addition, the invention further decreases downtime by repeating x, y and z geometry offsets, regardless of the tool type to which the tool-holding device is being changed.

It is a further object of the invention to provide a tool-holding device that can be used to replace any square shank tools on any two-axis lathe or turning center. By simple tailoring of the construction of the base of the invention for each particular lathe, the invention herein is usable on all lathes models, for example, turret and engine lathes, and all levels of machine including conventional lathes, NC lathes, CNC lathes, multi-tasking lathes and multi-axis lathes.

Other objects and advantages will be more fully apparent from the following disclosure.

SUMMARY OF THE INVENTION

The invention herein is a tool-holding device for a lathe that includes a lathe-attachment portion, with a base that is sized and shaped for placement on a lathe and attaching means for attaching the base to the lathe. The lathe-attachment portion also has a circular-perimeter, angled mounting apparatus integral with the base and having equal-sized wedge-shaped, double sloped clamping portions and a partly threaded central locking base-bore. Attached to the lathe-attachment portion is a frusto-conical multiple-tool tool-holder having a lower surface with an equal number of equal-sized wedge-shaped, double sloped clamping surfaces to mate with the clamping portions of the base. The upper surface of the tool-holder has insert pockets for attachment of tools. A central bore extends through the tool-holder for locking the tool-holding device to a lathe or other machine.

Other objects and features of the inventions will be more fully apparent from the following disclosure.

DETAILED DESCRIPTION OF THE INVENTION AND PREFERRED EMBODIMENTS THEREOF

The present invention provides a tool-holding device for any type of lathe, such as lathes used to work metal, or any other type of material, which may be sized and shaped without departing from the invention herein for any lathe. Using the tool-holding device of the invention herein, set up time is reduced, and many more operations may be performed without physically removing the tool-holding device. The invention is completely customizable for a particular machine and for particular tools to be used.

Unique to the invention herein is the means by which the two main pieces of the invention are held together, so that the two pieces clamp together due to their configuration, and under pressure of use, the self-clamping is increased, causing the pieces to be even more tightly held together, as discussed herein.

Figure 1:
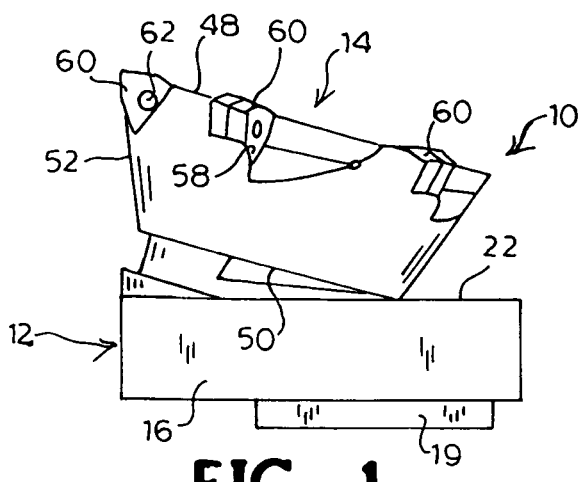
FIG. 1 is an elevational view of the tool-holding device of the invention herein showing the tilted mounting of a multiple-tool tool holder as mounted on a lathe-attachment portion of the invention for a turret lathe.
Figure 2:
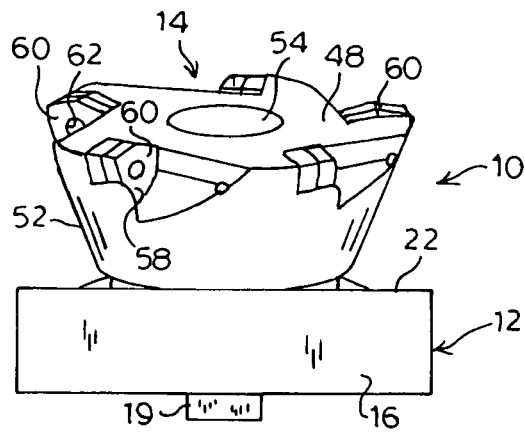
FIG. 2 is an elevational view of another side of the tool-holding device of FIG. 1, showing the lower end of the tilted multiple-tool tool holder.
Figure 3:
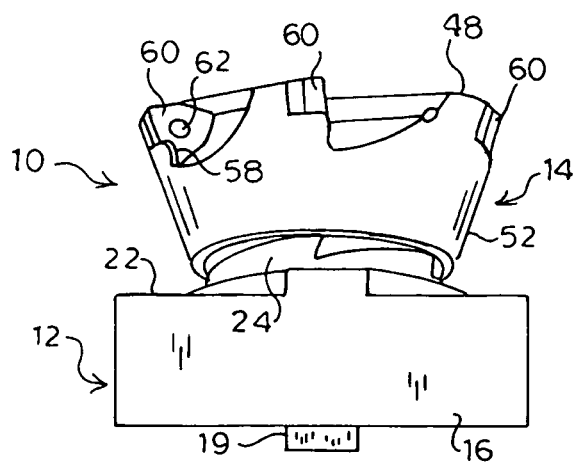
FIG. 3 is an elevational view of the upper side of the tool-holding device of FIG. 1.
Figure 4:
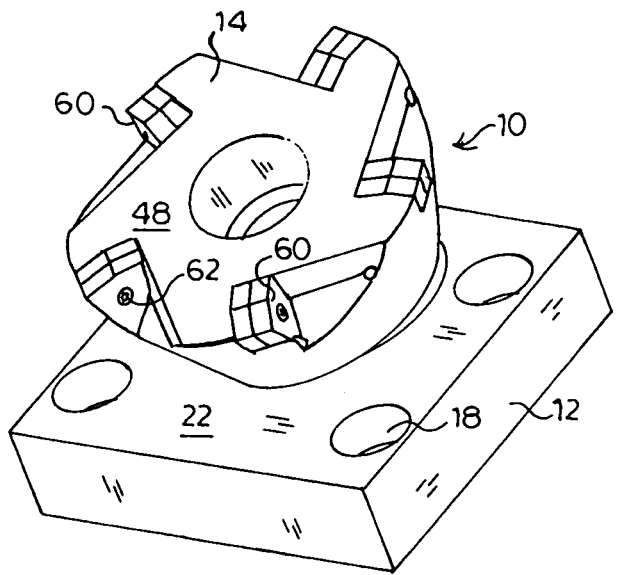
FIG. 4 is a top perspective view of the device of FIG. 1.
Figure 5:
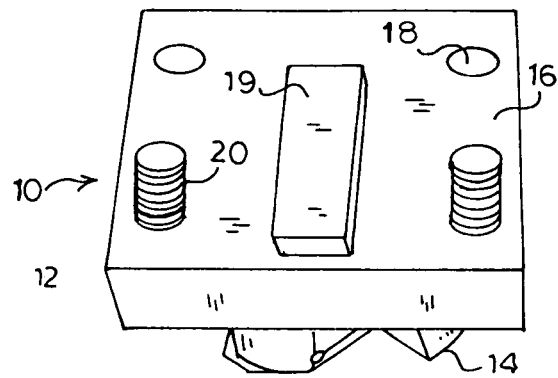
FIG. 5 is a bottom perspective view of the device of FIG. 1.
Figure 6:
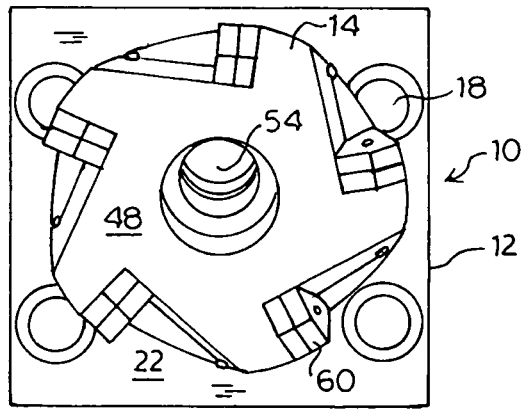
FIG. 6 is a top plan view of the device of FIG. 1.
Figure 7:
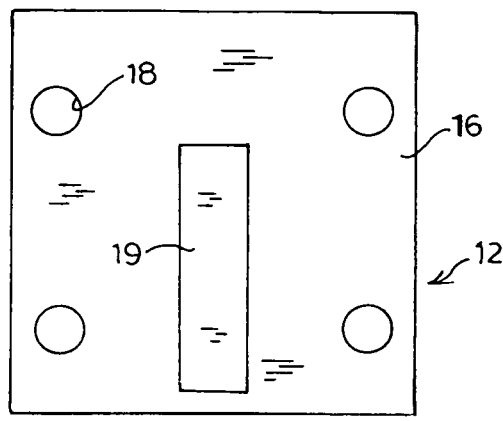
FIG. 7 is a bottom plan view of the lathe-attachment portion of the tool-holding device of the invention.
Figure 8:
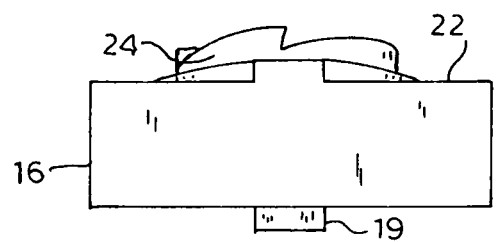
FIG. 8 is an elevational view of a first side of the lathe-attachment portion of FIG. 7.
Figure 9:
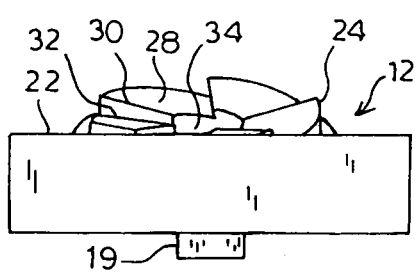
FIG. 9 is an elevational view of a second side of the lathe-attachment portion of FIG. 7 that is directly opposite the first side.
Figure 10:
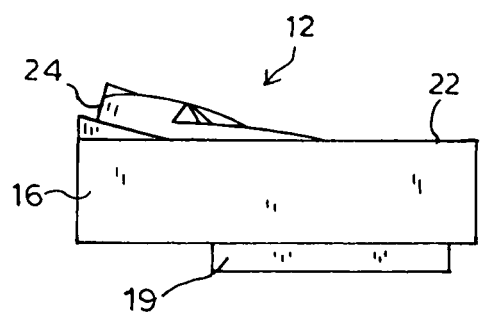
FIG. 10 is an elevational view of a third side of the lathe-attachment portion of FIG. 7 that is perpendicular to the first and second sides.
Figure 11:
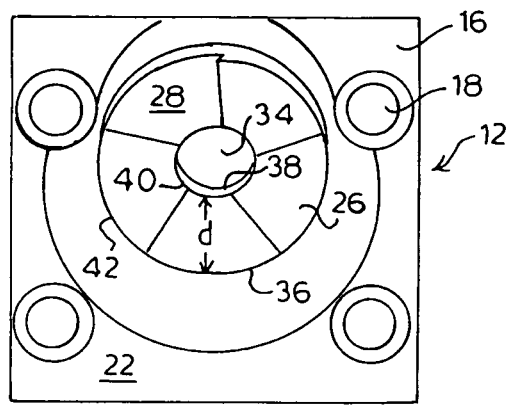
FIG. 11 is a top plan view of the lathe-attachment portion of FIG. 7.
Figure 12:
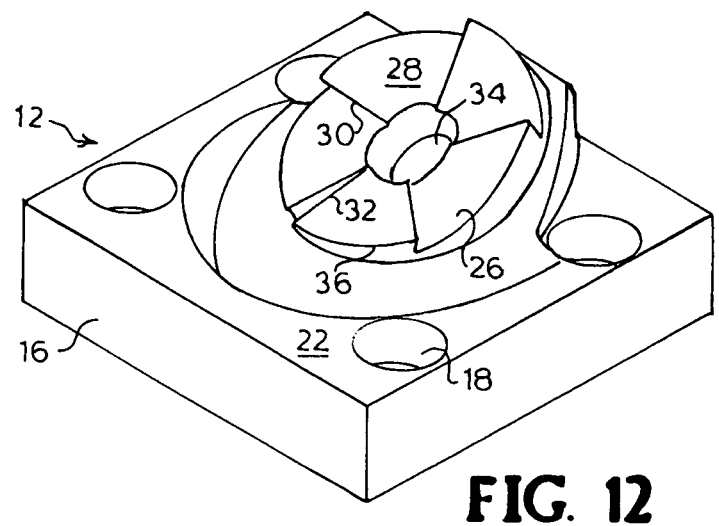
FIG. 12 is a side perspective view of the lathe-attachment portion of FIG. 7.

Thus, the tool-holding device 10 of the invention comprises two main pieces—a lathe-attachment portion 12 and a multiple-tool tool-holder 14 as shown together in FIGS. 1-6 and 26-27. As used herein the terms "bottom", "top" and "side" refer to the locations on the tool-holding device 10 when oriented as shown in FIG. 1. In a particular lathe, the tool-holding device 10 may well be mounted in a different orientation; for example, on the lathe for which the particular embodiment shown in the figures is designed, the tool-holding device is mounted on the outside perimeter of a CNC turret, parallel to the z axis or work piece centerline.

The lathe-attachment portion 12 of the invention (FIGS. 1-12B) has a base 16 that is sized and shaped for placement on and attachment to a lathe in the position on the lathe as known in the art where a square-shank tool holder is placed in the prior art. The base 16 shown in the Figures herein (e.g. FIGS. 1-12B) is sized and shaped for a CNC lathe, which requires attachment by four bolts and has a groove into which a central rectangular portion 19 slides into an alignment slot that keeps it square to the axis of the turret when mounting. Thus, the particular base 16 designed for this lathe is 4×4 inches, and is 1¼ inches high. One of ordinary skill in the art can easily determine the size and shape of the base 16 for a particular lathe by knowledge of the shape, size and orientation of the place on the lathe where a square-shank tool holder is attached to the turret or tool post for NC or conventional lathes.

The lathe attachment portion 12 also includes an attaching means for attaching the base 12 to the turret of a lathe, which in the case of this particular lathe means that the base 12 has four mounting holes 18 (FIGS. 4, 5, 6, 7, 11, and 12) in order that the tool-holding device can be firmly attached with bolts 20 to the lathe. Other lathes have other means of mounting of the tool holder for the square shank tools, and bases for those lathes are appropriately modified. For example, use of the invention with VDI, BMT, and other manufacturers would require adjustment in the dimensions and base configuration of the invention to conform to the particular lathe's dimensions, turret sizes, tool post sizes, and mounting configuration. Thus, the base 12 may be configured to attach to any turret, tool post, cross slide or other structure of a lathe that is used to attach prior tools.

On the opposite side of the portion of the base that is mounted to the lathe (called the top side 22 herein), the lathe attachment portion further comprises a circular-perimeter, angled mounting apparatus 24 integral with the base 16 and having a plurality of equal-sized wedge-shaped, double sloped clamping portions 26 as shown in FIGS. 11, 12, 14 and 15.

Figure 16:
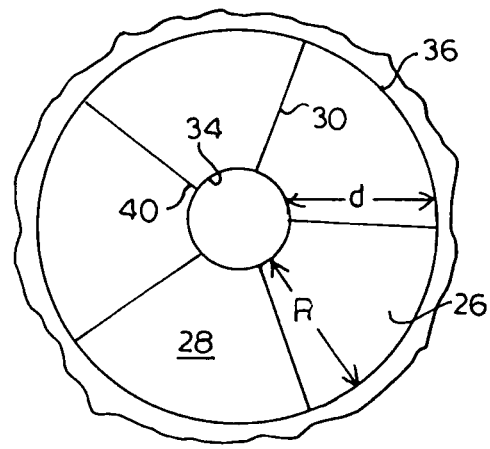
FIG. 16 is a close-up top plan view of the lathe-attachment portion of the invention.
Figure 17:
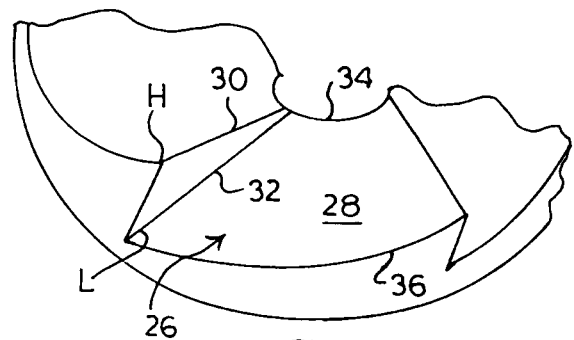
FIG. 17 is a partial perspective view of clamping portions of the invention.
Figure 20:
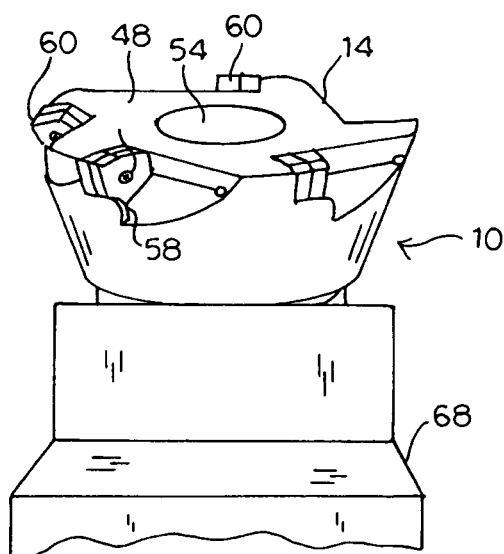
FIG. 20 is a side perspective view of the lathe attachment portion of FIG. 19.
Figure 18:
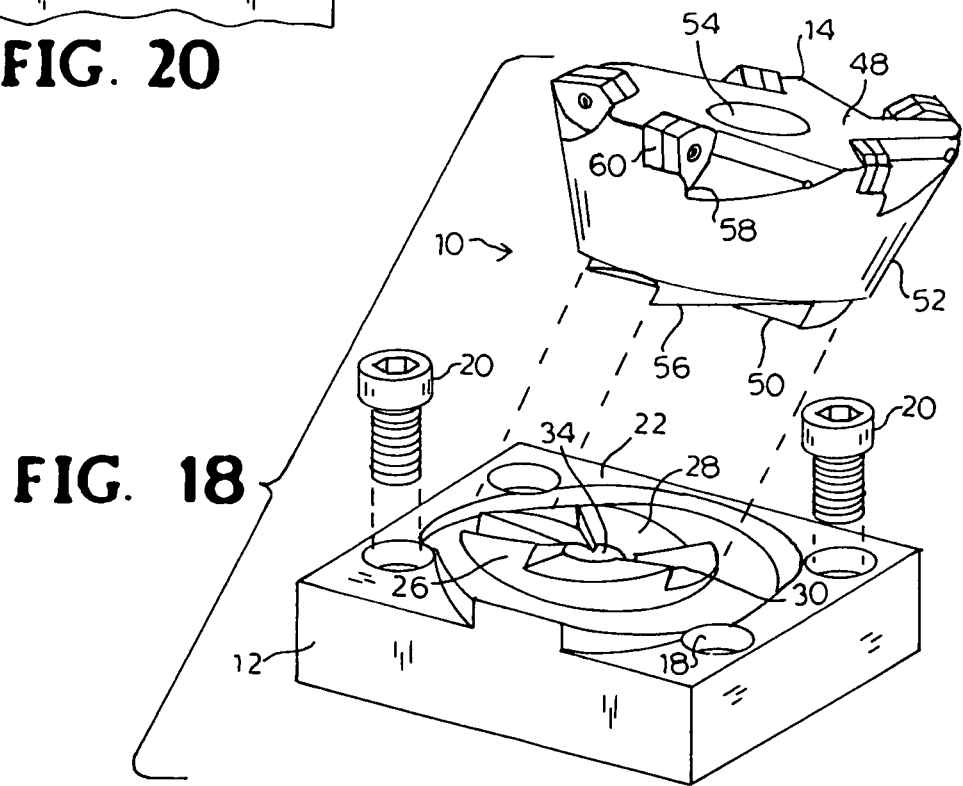
FIG. 18 is an exploded side perspective view of the multiple tool holder of the invention.
Figure 19:
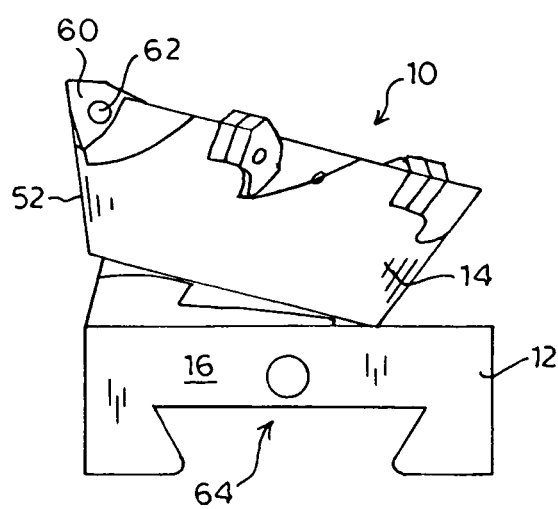
FIG. 19 is a side elevational view of the tool-holding device of the invention with a second embodiment of the lathe attachment portion.
Figure 21:
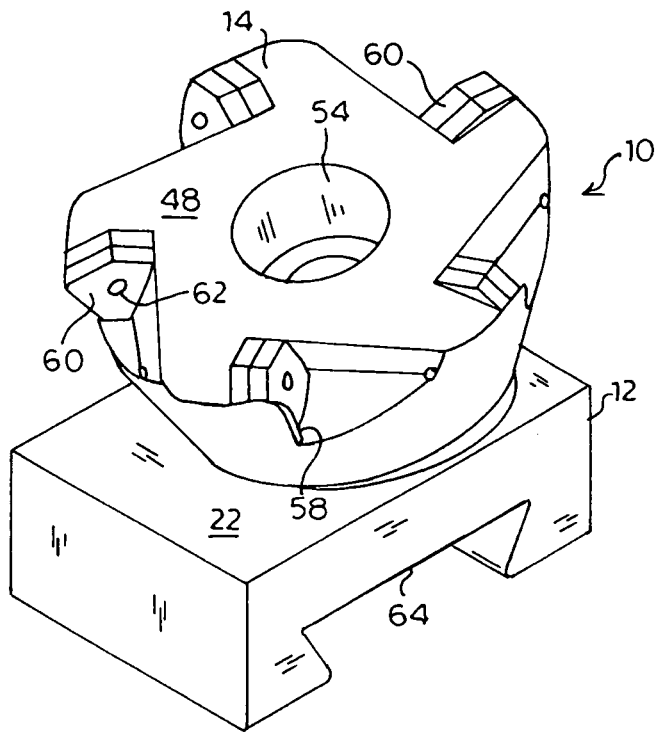
FIG. 21 is a top perspective view of the tool-holding device of FIG. 19.
Figure 22:
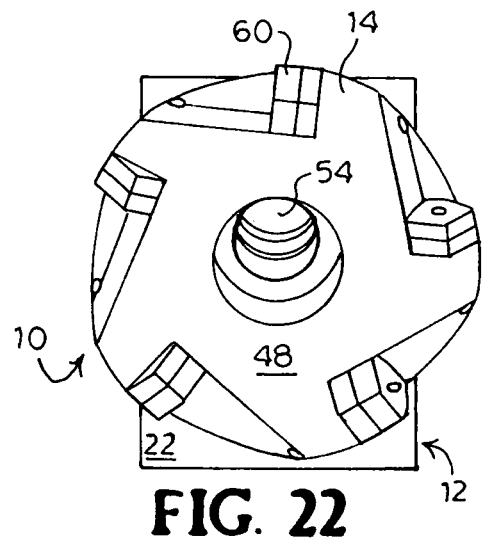
FIG. 22 is a top plan view of the lathe tool-holding device of FIG. 19.
Figure 23:
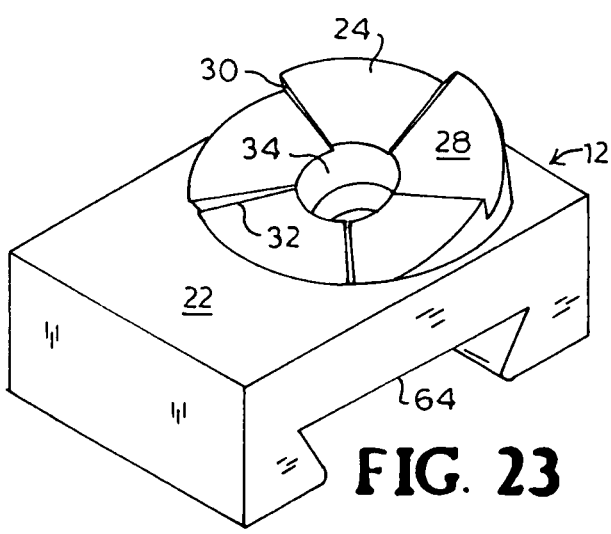
FIG. 23 is a top perspective view of the lathe attachment portion of FIG. 19.
Figure 24:
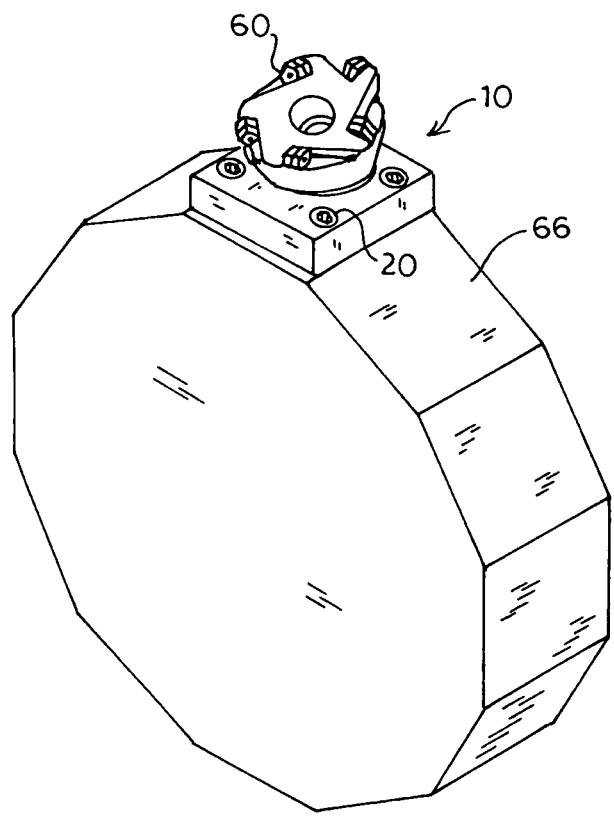
FIG. 24 is a perspective view of the tool-holding device of FIG. 19 mounted on a lathe.
Figure 25:
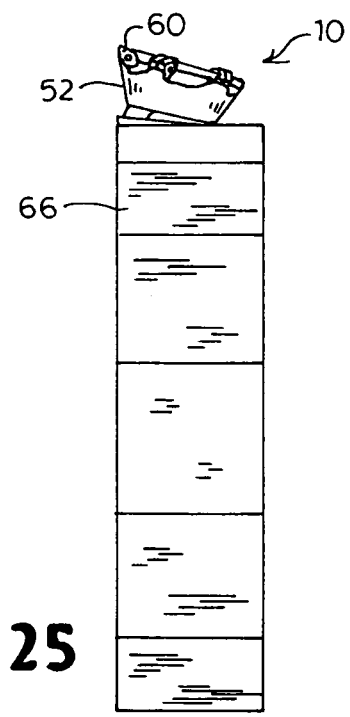
FIG. 25 is an elevational view of the tool-holding device of FIG. 24.

As shown in FIGS. 16-17, each clamping portion 26 has a slanted planar upper surface 28. Each upper surface 28 has a straight upper edge 30 and a straight lower edge 32, an inner arced edge 34, and an outer arced edge 36. The outer arced edges together form a complete circular shape when viewed from above the mounting apparatus 24. The slanted upper surface 28 slopes downward on each clamping portion 26 from the outer arced edge 36 toward the threaded base bore 38 and also downward on each clamping portion 26 from the straight upper edge 30 toward the straight lower edge. The inner arced edges 34 of the clamping portions together form a top of a threaded base-bore 38. The straight upper edge 30 of each clamping portion 26 has an inner end 40 and an outer end 42, and is angled as shown so that when viewed from above, the inner end 40 of each straight upper edge 30 is angled backward (counterclockwise) (or clockwise for left-handed tools) from the radius "R" that extends to the base-bore 38 from the outer end 42 (FIG. 16) so that the radius R on a particular clamping portion 26 is not parallel to the location "d" of the straight upper edge 30 at the location of the upper edge 30. The upper edge 30 of each clamping portion 26 is above and overhangs the lower edge 32 of an adjacent clamping portion 26 as shown in FIG. 17. The lowest point "L" on each clamping portion with respect to the vertical axis of the mounting apparatus is where the straight lower edge 30 intersects the inner arced edge 34 and the highest point "H" on each clamping portion 26 is where the upper edge 30 intersects the outer arced edge 36 (FIG. 17).

The angle of the central axis of the mounting apparatus 24 with respect to the plane of the base 16 is designed to create a self-seating and self-locating connection that only becomes stronger as more cutting pressure or force is applied. The size of the mounting apparatus 24 must be sufficiently large so that the multiple-tool tool holder-14 can be mounted to it, but must be small enough so that there is the needed clearance around the attached multiple-tool tool holder 14 during operation of the invention in the particular lathe. For the mounting apparatus 24 for the CNC lathe, an angle of about 22 degrees, and a height of about 0.3 inches and diameter of about 3 inches is preferred.

The base 16 further has a partly threaded central locking base-bore 38 as referred to above. This bore 38 extends entirely through the base 16 and should be sufficient to hold the cutter in place while repelling the force of gravity only (that is all the bolt must do; it does not perform any function during the cutting motions). The size is determined by availability. The bore 38 is interiorly threaded 44 a sufficient distance as known in the art so that a central bolt or other central fastening mechanism that functions as a threadable turnable locking piece (such as a slot bolt that is known in the art and not shown) extending through the tool-holding device 10 and into, and threaded within, the bore 38 holds the tool-holding device securely on the base 16.

Figure 13:
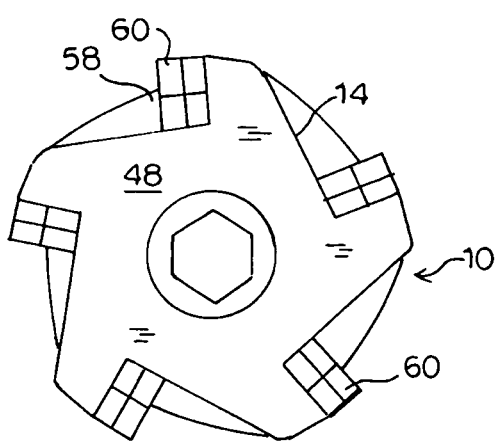
FIG. 13 is a top plan view of the multiple-tool tool holder of the invention.

The multiple-tool tool-holder 14 of the embodiment of the invention shown herein is frusto-conical (a truncated cone), and as such has an upper surface 48, a lower surface 50, and upwardly slanted out sides 52 as shown (FIGS. 13-15), as well as a central bore 54. The lower surface 50 of the tool-holder 14 has an equal number of equal-sized wedge-shaped, double sloped clamping surfaces 56 so that it may be mated to fit closely with the clamping portions 26 of the base 16 as described above.

Figure 14:
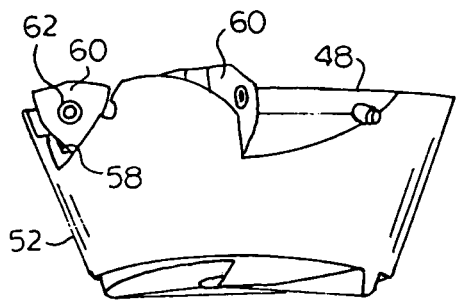
FIG. 14 is an elevational view of a tilted side of the multiple-tool tool holder of FIG. 13.
Figure 15:
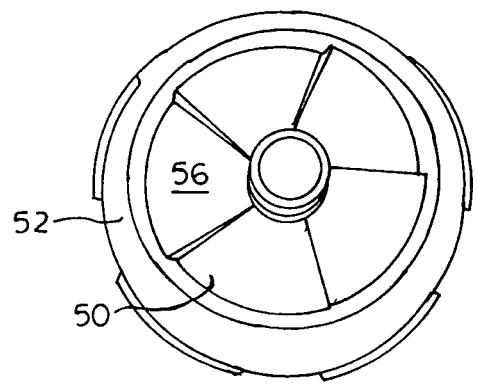
FIG. 15 is a bottom plan view of the multiple-tool tool holder.

The upper surface 48 of the tool-holder 14 has a plurality of equally-spaced insert pockets 58 for attachment of tools (inserts 60). The size, shape, and orientation of the insert pockets 58 are structured to fit tools known in the art. For example, as shown in FIG. 14, a WNMG insert (80° Trigon roughing insert) is shown. The assembled tool-holder 14 thus includes tools 60, fastened in the insert pockets 58 with cam screws 62 or other means known in the art. The tools held in the pockets of a particular tool-holder may all be the same, or may be varied, with any desired assortment of tools being held in each tool-holder 14.

Figure 26:
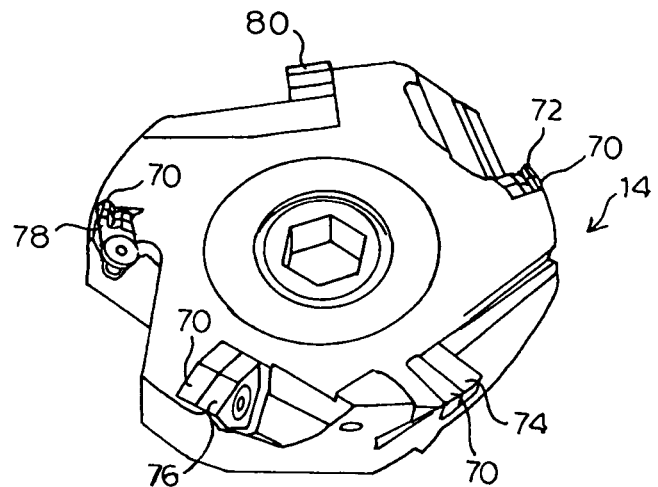
FIG. 26 is a perspective view of a multiple-tool tool holder with different inserts in the insert pockets as viewed from a first side.
Figure 27:
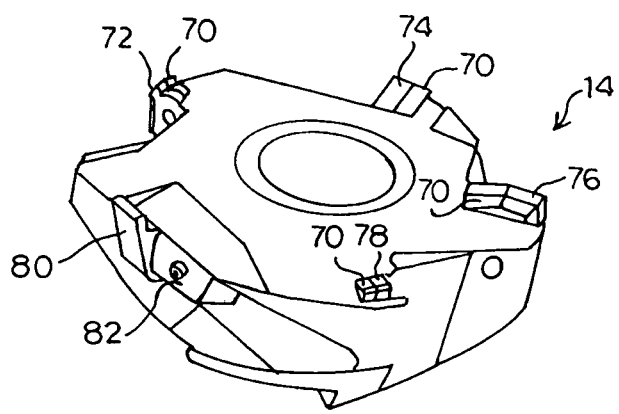
FIG. 27 is a perspective view of the multiple-tool tool holder of FIG. 26 as viewed from another side.

For example, as shown in FIGS. 26-27, a variety of inserts may be used on a single tool-holder 14. Most of the insert shown are shown with an insert pad 70 as known in the art as the carbide backing piece that increases the strength of the inserts. Inserts shown are a 60-degree threading insert 72, a VNMG (or 35-degree diamond) style insert 74 for finish turning and profiling, a WNMG (or 80 degree trigon) style insert 76 used for facing and rough turning, a threading insert 78 for making 29 degree Stub Acme threads, and a grooving insert 80, which has not hole through the center of it and stands upright whereas the other styles do not. For this reason insert 80 requires a clamp 82 to secure it in its pocket, unlike the others that use the screw or cam screw. The threaders only require regular flathead screws to secure them into the pocket. The WNMG and VNMG use the cam screw (or cam-lock system) to be secured into their respective pockets.

In addition to different inserts used for different purposes, the different insert pockets may hold different grades (grades for different materials) as known in the art. In any case, regardless of the type of insert or grade of insert, once the tool-holding device is set up with one of the inserts, the device may be used with any of the inserts without readjusting (only is touched off once).

The tool-holder 14 has a central bore 54 for insertion of a threaded turnable locking piece 46, which is placed in the central bore 54 as shown in FIG. 1, and is used to lock the tool-holder 14 to the lathe-attachment portion 12 by threading the locking piece 46 in the partly threaded central locking base-bore 38. The locking piece 46 can simply be a threaded bolt and can be hand turned; however for increased security and safety in use, a handled wrench should be used.

FIGS. 19-23 show a second embodiment of the invention designed for use on another type of lathe, a conventional or NC lathe, such as is made by many manufacturers. In this embodiment, the lathe attachment portion is differently configured so that a dovetail wedge is used to attach to a tool post.

As discussed above, the dimensions of each tool-holding device made according to the invention herein are constrained by the machine for which they are made. One of ordinary skill in the art with knowledge of the lathe on which the tool-holding device 10 is to be used can machine a base and determine how large a tool-holder 14 is appropriate for that lathe.

Coolant bores (not shown) are added as known in the art, depending on the shape and size of the tool-holding device 10.

To use the invention, one mounts the tool-holding device 10 onto the turret of the lathe. Next, one uses the x and z offsets on the machine to set the tools in relation to the work piece. Thus, to use the tool-holding device 10 of the invention, one or more tool-holding devices 10 having the desired tools in the desired pockets is selected for the project to be completed with the machine and are mounted on the lathe placing the lathe-attachment portion 12 on the machine and firmly fastening the lathe-attachment portion 12 to the lathe in the same manner as done with prior tool holders. Once the tool-holding device is mounted, it may be allowed to remain on it, or as known in the art, may be changed when the machine is being set up for new functions on a work piece. The machine is programmed using software that comes with the machine for a sequence of functions that are to be performed on the work piece. In contrast to prior lathe tools, however, once the offsets and other parameters are determined for one tool type, all others can will use the same offsets.

The tool-holding device of the invention can be made on a milling machine of almost any type with at least 5 axes, or even on a multi-axis lathe with live tooling. While the tool-holding device of the invention may be made of any material known in the art that is sufficiently strong and that can be formed into a tool-holding device, one possible way of making the tool-holding device is described here. Thus, the tool-holding device of the invention may be made from a block of heat treatable steel using standard milling tools, and although it could be cast, it preferably is not cast but is a solid piece of drawn steel. It is important that the block be hard but not brittle, and it has been found that steel with a Rockwell hardness scale of 37-39 is satisfactory, so the block does not dent or have pieces of debris ground into it when the tool station block is being used. Steel in the 4000 series known in the art that are high in chromium (e.g., 4140, 4130, and 4340) may be used.

Any type of manufacturing or production facility that produces any type of item on a lathe can benefit from this invention because it will reduce down times and run times therefore increasing efficiency and profitability.

The clamping system of the tool-holding device of the invention as discussed herein is unique and can be used on other devices to hold two components together, particularly when there is rotational pressure on the device as on a lathe with the tool-holding device of the invention. The clamping system of the invention also reduces chatter and adds to rigidity of the invention. This clamping system could be used to connect any two components in increase strength and decrease vibration. Thus, the clamping system itself comprises a circular-perimeter, angled mounting apparatus having a plurality of equal-sized wedge-shaped, double sloped clamping portions; and a frusto-conical apparatus having an upper surface, a lower surface, and slanted sides, the lower surface having an equal number of equal-sized wedge-shaped, double sloped clamping surfaces to mate with the clamping portions.

While the invention has been described with reference to specific embodiments, it will be appreciated that numerous variations, modifications, and embodiments are possible, and accordingly, all such variations, modifications, and embodiments are to be regarded as being within the spirit and scope of the invention.

What is claimed is:

1. A tool-holding device, comprising:
   a) a lathe-attachment portion, having:
      i) a base sized and shaped for placement on a turret, tool post or cross slide of a lathe and an alignment portion that aligns the base when the base is attached to the lathe;
      ii) a circular-perimeter, angled mounting apparatus integral with the base and having a plurality of equal-sized wedge-shaped, double sloped clamping portions;
      iii) a partly threaded central locking base-bore; and
   b) a frusto-conical multiple-tool tool-holder having an upper surface, a lower surface, slanted sides, and a central bore:
      i) the lower surface having an equal number of equal-sized wedge-shaped, double sloped clamping surfaces to mate with the clamping portions of the base;
      ii) the upper surface having a plurality of equally-spaced insert pockets for attachment of tools, with one tool per insert pocket, with the pockets capable of holding tools that are identical or different from tools held by other pockets; and
      iii) tools affixed in the insert pockets;
   wherein the tool-holding device is attachable to a lathe using a distally threaded turnable locking piece for placement in the central bore and for locking the tool-holder to the base by threading the locking piece in the partly threaded central locking base-bore.

2. The tool-holding device of claim 1, wherein there are five clamping portions and five clamping surfaces.

3. The tool-holding device of claim 2, wherein each clamping portion has:
   i) a slanted upper surface, each slanted upper surface having a straight upper edge and a straight lower end,
   ii) an inner arced edge, and
   iii) an outer arced edge,
      wherein the inner arced edges of the clamping portions together form a top of the threaded base-bore,
      wherein the straight upper edge of each clamping portion has an inner end and an outer end, and is angled so that the inner end of each straight upper edge is closer to the clamping portion that is adjacent the lower end than is the radius extending to the base-bore from the outer end,
      wherein the upper edge of each clamping portion is above and extends over the lower end of an adjacent clamping portion, and
      wherein the inner edge of each clamping portion is radially below the outer edge of that clamping portion.

4. A tool-holding clamping device, comprising:
   a) a circular-perimeter, angled mounting apparatus having a plurality of equal-sized wedge-shaped, double sloped clamping portions, with the wedge shapes extending radially out from a central opening; and
   b) a frusto-conical apparatus having an upper surface, a lower surface, and slanted sides, the lower surface having an equal number of equal-sized wedge-shaped, double sloped clamping surfaces to mate with the clamping portions.

5. The tool-holding clamping device of claim 4 wherein each of the double sloped clamping portions has a first sloped surface and a second sloped surface, each of the first and second sloped surfaces extending radially out from the central opening, each of the first sloped surfaces being larger than the respective second sloped surface.

* * * * *